United States Patent
Taylor et al.

(10) Patent No.: US 8,122,284 B2
(45) Date of Patent: Feb. 21, 2012

(54) N+1 FAILOVER AND RESYNCHRONIZATION OF DATA STORAGE APPLIANCES

(76) Inventors: Tracy M. Taylor, Concord, MA (US); Craig Leckband, Westford, MA (US); Yongmin Chen, Wellesley, MA (US)

(*) Notice: Subject to any disclaimer, the term of this patent is extended or adjusted under 35 U.S.C. 154(b) by 0 days.

(21) Appl. No.: 12/817,384

(22) Filed: Jun. 17, 2010

(65) Prior Publication Data
US 2011/0060940 A1    Mar. 10, 2011

Related U.S. Application Data

(60) Provisional application No. 61/218,278, filed on Jun. 18, 2009.

(51) Int. Cl.
*G06F 11/00* (2006.01)
(52) U.S. Cl. ............. 714/4.12; 714/4.11; 714/6.12; 714/6.2; 714/6.22; 714/6.23; 714/6.3
(58) Field of Classification Search ............ 714/4.11, 714/4.12, 6.12, 6.2, 6.22, 6.23, 6.3
See application file for complete search history.

(56) References Cited

U.S. PATENT DOCUMENTS

| | | | | |
|---|---|---|---|---|
| 6,654,862 B2* | 11/2003 | Morris | | 711/162 |
| 7,089,448 B2* | 8/2006 | Hinshaw et al. | | 714/6.12 |
| 7,299,378 B2* | 11/2007 | Chandrasekaran et al. | | 714/15 |
| 7,337,351 B2* | 2/2008 | Zane et al. | | 714/6.12 |
| 2002/0059539 A1* | 5/2002 | Anderson | | 714/6 |
| 2004/0128442 A1* | 7/2004 | Hinshaw et al. | | 711/114 |
| 2005/0021627 A1* | 1/2005 | Achiwa et al. | | 709/205 |
| 2005/0022051 A1* | 1/2005 | Zane et al. | | 714/6 |
| 2005/0097390 A1* | 5/2005 | Tanaka et al. | | 714/5 |
| 2005/0198327 A1* | 9/2005 | Iwamura et al. | | 709/229 |
| 2006/0190763 A1* | 8/2006 | Ashmore | | 714/6 |
| 2006/0203718 A1* | 9/2006 | Benhase et al. | | 370/220 |
| 2009/0077414 A1* | 3/2009 | Benhase et al. | | 714/4 |
| 2009/0177720 A1* | 7/2009 | Shitomi et al. | | 707/204 |
| 2011/0055498 A1* | 3/2011 | Kano | | 711/156 |

* cited by examiner

*Primary Examiner* — Robert Beausoliel, Jr.
*Assistant Examiner* — Joshua P Lottich
(74) *Attorney, Agent, or Firm* — Goodwin Procter LLP

(57) ABSTRACT

Reciprocal data storage protection is combined with "N+1" hardware provisioning and on-demand resynchronization to guarantee full data availability without impairing performance. Pairs of nodes are identified that act as backups for each other, where each node stores a secondary copy of data allocated to its reciprocal, paired node. A single extra node is brought online to take over the role of a failed node and assumes the role of the primary node it replaced.

10 Claims, 3 Drawing Sheets

N+1 FAILOVER AND RESYNCHRONIZATION OF DATA STORAGE APPLIANCES

CROSS-REFERENCE TO RELATED APPLICATIONS

This application claims priority to and the benefits of U.S. provisional patent application Ser. No. 61/218,278, filed Jun. 18, 2009, the entire disclosure of which is incorporated be reference herein.

FIELD OF THE INVENTION

This invention relates generally to systems for storing computer data, and more specifically to failover mechanisms for database appliances.

BACKGROUND

Network-attached storage (NAS) appliances allow multiple computers to share data storage devices, while offloading management and administration of the storage to the appliance. General-purpose NAS appliances typically present a file-system interface, enabling computers to access data stored within the NAS in the same way that computers would access files on their own local storage.

A network-attached database storage appliance is a special type of NAS, used for storage and retrieval of record-oriented data accessed by a database management systems (DBMS) that typically supports applications such as accounting systems, records-management systems for medical, customer or employee files, etc. In such cases, the general-purpose file-system interface is replaced with a record-oriented interface, such as an application that supports one or more dialects of a structured query language (SQL). Because the unit of storage and retrieval is a record, rather than a file, a network-attached database storage appliance typically controls concurrent access to individual records when more than one client, application or user is requesting access to or updating the same record at the same time. In addition, the network-attached database storage appliance may also provide other management functions such as compression, encryption, mirroring and replication.

In many implementations, the database-processing functions (querying data, updating data, inserting new records, etc.) tend to require the most processing resources and take the most time to complete. This is especially true in large-scale applications in which terabytes or even petabytes of data are stored and manipulated. One approach for increasing the processing speed of such applications is the use of massively-parallel processing ("MPP") architectures. MPP architectures utilize independent processors or servers (often referred to as "blades" or "nodes") onto which data is distributed according to some allocation methodology. This distribution allows the individual nodes to collectively resolve a query by scanning data and executing the query on each node in parallel. This divide-and-conquer approach delivers high performance and scales linearly as new servers are added into the architecture.

However, it is not uncommon for a node to fail, in which case the data allocated to that node is unavailable. This results in incomplete and inaccurate retrieval results. One approach to ensuring that all the data remains available regardless of individual node failures is to maintain a copy of each node's data on one or more other nodes. While this technique may address the immediate challenge of providing accurate query results, it significantly degrades overall system performance. Consider, for example, an array of twenty nodes that store and process data according to an allocation scheme that guarantees optimal performance (e.g., each node is responsible for approximately 5% of the processing load). Using conventional redundancy techniques, if a node fails, another node will now be responsible for 10% of the processing load. Because MPP system performance is defined by the slowest node, overall system performance is halved.

What is needed, therefore, is a data redundancy/mirroring technique that maintains optimal system-wide performance in response to individual node failures.

SUMMARY OF THE INVENTION

Embodiments of the invention provide methods and systems for implementing redundancy schemes across an array of MPP nodes. More specifically, reciprocal data storage protection is combined with "N+1" hardware provisioning and on-demand resynchronization to guarantee full data availability without impairing performance. Reciprocal data sharing involves defining "pairs" of nodes that act as backups for each other, where each node stores a secondary copy of data allocated to its reciprocal, paired node. N+1 hardware provisioning uses a single extra node that is brought online to take over the role of the node that has failed. Using on-demand resynchronization, the extra node assumes the role of the primary node it replaces, even though the data needed to perform the work does not reside on the extra node. In some embodiments, when the N+1$^{th}$ node needs to read a block from disk, a resynch bit is checked to see if the block has already been brought over from the secondary copy of the failed node's data that resides on its reciprocal pair node.

Therefore, one aspect of the invention provides an array of network-attached storage appliances for storing data that includes reciprocal appliance pairings and a failover storage appliance. Each appliance pairing includes (or consists of) a pair of nodes connected to the network and stores and each node stores data associated with both nodes of the pairing. The failover storage appliance, also being connected to the network, receives data from the first appliance of a pairing upon detecting a failure of the second appliance of the pairing.

In some embodiments, each node includes at least two data partitions in which one data partition stores data associated with the respective node and a second data partition stores data associated with a reciprocal node. The data may be organized in data blocks, for example. Each node may also include at least two file system directories, wherein one file system directory catalogs data associated with the respective node and a second file system directory catalogs data associated with a reciprocal node. The failover network-attached storage appliance may also be configured to receive and/or process a data query originally intended to be processed by the failed appliance. In certain implementations, the failover network-attached storage appliance checks a bitmap value associated with the data blocks to determine if data needed to process the data query exists on the failover network-attached storage appliance. The data may be received at the failover network-attached storage appliance in response to execution of a stored procedure requesting the data, in response to receiving a data query requiring the data, or both.

In another aspect of the invention, a method for storing and retrieving data includes the steps of providing reciprocal appliance pairings of processing nodes and storing, at each of the nodes, data associated with both nodes of the pairing.

Upon detecting a failure of the second appliance of a pairing receiving, at a failover storage appliance, data from the first appliance of the pairing.

In some embodiments, a data query originally intended to be processed by the failed appliance is received at and processed by the failover storage appliance. The stored data may be organized using data blocks, and in some implementations a bitmap value is associated with the data blocks to determine if data needed to process the data query exists on the failover storage appliance. The data may be received at the failover storage appliance in response to execution of a stored procedure requesting the data, and/or in response to receiving the data query requiring the data.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
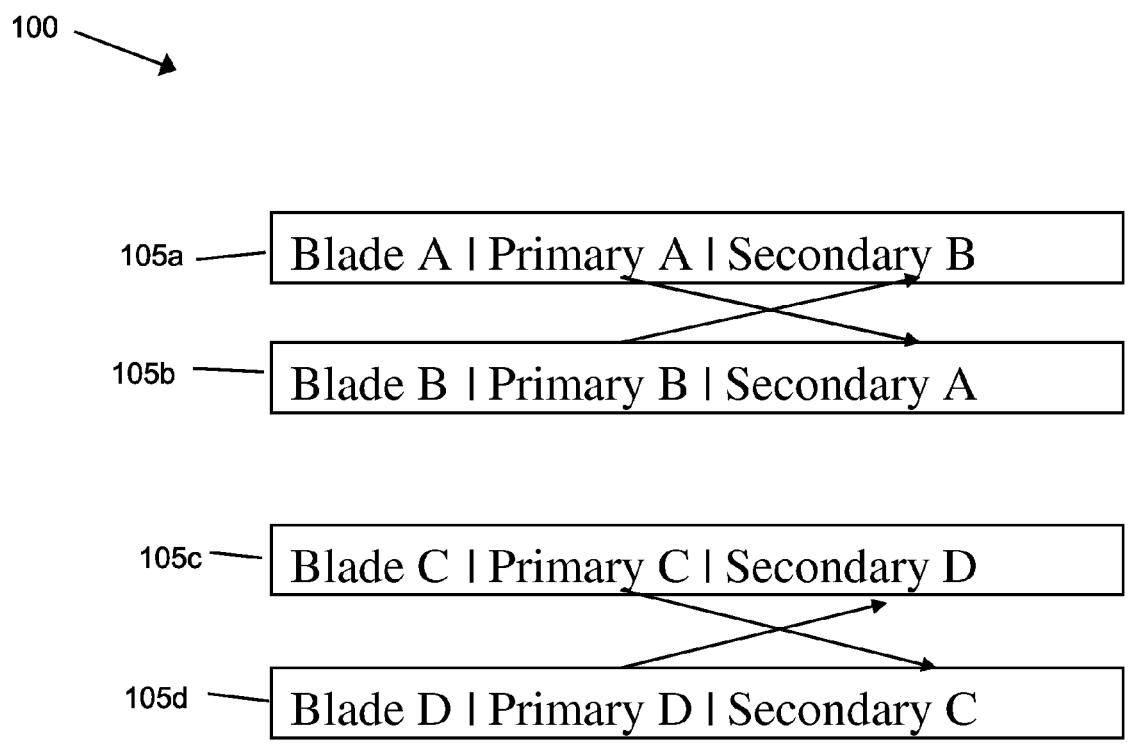
FIG. 1 illustrates one example of reciprocal mirroring topology in an MPP array.

In general, embodiments of the invention involve systems and techniques for implementing mirroring in a massively-parallel database processing architecture. Typically, computer applications and enterprise information systems utilize one or more database management systems (DBMS) to provide data, configuration information, and user permissions. In certain cases, a single DBMS "instance" may support a single application, whereas in other cases, many applications may rely on one DBMS. Frequently, enterprise information systems utilize data from numerous applications (combining data from sales systems, inventory systems, and financial systems into a single executive-level performance dashboard, for example). As used herein the term "application" broadly refers to any type of computer-implemented system that uses and/or manipulates data, including, for example, enterprise information systems. The number and type of applications can vary widely, and include both transactionally based applications (e.g., trading systems, customer service systems, etc.), business intelligence and data mining applications, and database management systems themselves.

Similarly, the number and type of DBMSs may differ widely from implementation to implementation, some using only a single instance of a DBMS and others including numerous instances. In some cases, an implementation may include DBMSs from different vendors. The applications may reside solely on a client machine and interact with a database server on which the DBMS operates, or instead, portions of the applications may reside on an application server that provides the operational instructions, application screens, and/or data to client devices. Examples of DBMS systems that provide such functionality include the SQLServer Database Server by Microsoft Corporation, the DB2 Database Server by IBM, the PostgreSQL by PostgreSQL Global Development Group, and the MySQL and ORACLE Database Servers offered by ORACLE Corporation.

In large-scale implementations of data-intensive computer applications, multiple data storage devices (also referred to as network-attached storage (NAS) appliances, "nodes" or "blades") may be used to provide additional storage in support of the DBMS and applications. In conventional implementations, each DBMS is configured such that when presented with a data manipulation instruction (e.g., select, insert, delete, update) from an application, the DBMS queries the correct blade for the requested data. Further, centralized DBMS services tend to be located on one physical host as part of the DBMS itself. As such, all query planning, processing and optimization functionality is required to pass through this single host prior to the distribution of queries across the distributed blades. This single point of processing creates a bottleneck and limits scalability. Because some of these services are DBMS-specific, changing the configuration of the storage array (e.g., replacing the DBMS, adding new blades, redistributing data among blades) requires significant effort.

This bottleneck becomes even more prominent when implementing a massively parallel storage system. One conventional approach for providing massively parallel storage provides a host database component, often referred to as a query coordinator, and a plurality of data server components. End users and applications submit data requests and updates to the host database component, which distributes queries among the data server components based on the location of the requested data. The requested data may reside in a block file system, on disk, or some combination thereof. The host database component is also responsible for managing transactions, record locking, the catalog, and various other administrative functions.

In such an arrangement, all query processing and administrative functions pass through the host, once again creating a performance bottleneck and a single point of failure. In some instances the bottleneck may be the host itself, as it has a finite amount of memory, CPU capacity and other processing capabilities. As the number of users and applications grow, so does the load on the host. While replicating the host (such that each host instance can access each data server) may alleviate the load and single-point-of-failure problems, the transaction, locking, cataloging and administrative functions performed by the replicated hosts must be synchronized, creating a significant administrative and overhead burden.

To address these issues, true MPP database systems have been developed that eliminate the need for a central host and divide the entire processing burden among the nodes. While this technique can deliver good performance, failover and redundancy planning can be challenging, as any single node can become the bottleneck of the entire system when taking on processing duties previously allocated to a non-operational node.

Various embodiments of the present invention address this challenge by employing a combination of N+1 hardware provisioning, reciprocal data storage protection (also referred to as "mirroring"), and on-demand data synchronization.

More specifically, in a system of N operational nodes, an $N+1^{th}$ node is implemented that, during normal operations, does not perform any processing functions. If, however, one of the N operational nodes fails, the $N+1^{th}$ node takes over, effectively performing the work of the failed node. In most implementations, the data needed to perform the work does not yet reside on the node. This eliminates the need for constant synchronization and mirroring while the database is fully operational. Instead, data synchronization is performed in real-time, on an "on-demand" basis.

The mirroring topology may be implemented using reciprocal mirroring, ring mirroring, or in some cases a combination of both. FIG. 1 illustrates one example of reciprocal mirroring topology. Reciprocal mirroring may be used when an array 100 includes an even number of nodes 105. In such cases, node pairings (105a and 105b, and 105c and 105d)) are defined such that each node is uniquely attributed to another node such that each is considered a "backup" of the other. The two nodes of a pair each store primary and secondary data "slices." For a given node, the primary slice of data represents data formally attributed to that node, while the secondary slice is a copy of the reciprocal node's primary slice.

Figure 2:
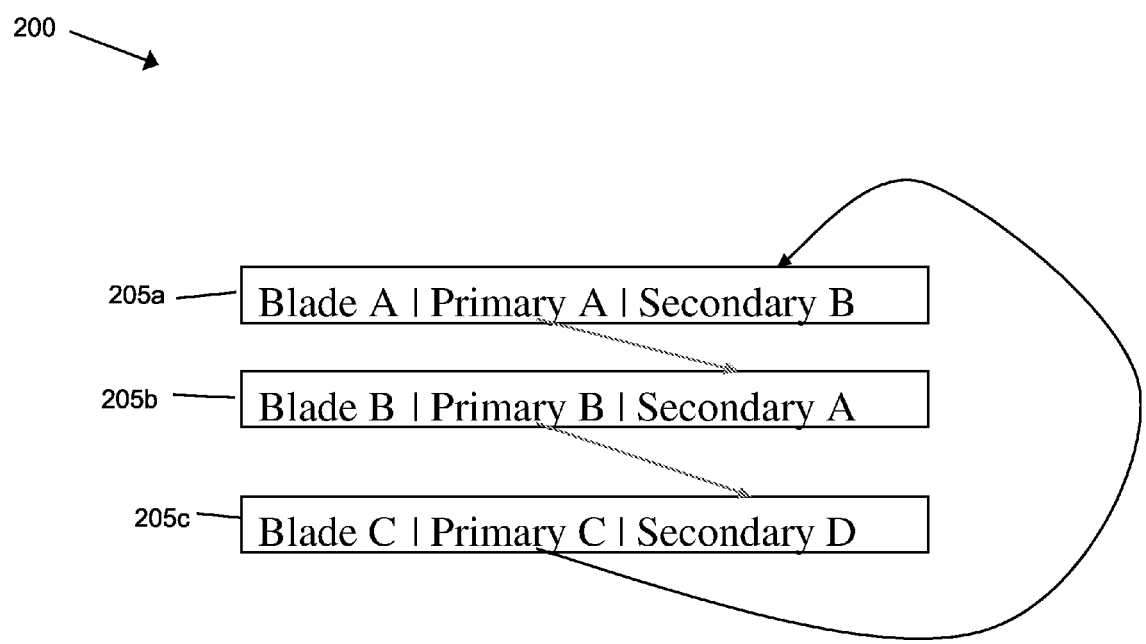
FIG. 2 illustrates one example of ring mirroring topology in an MPP array.

Ring mirroring may be used in instances in which there are an odd number of nodes as well as in arrays having an even number of nodes. FIG. 2 illustrates an example of ring mirroring topology in an array 200 having an odd number of nodes 205. Like reciprocal mirroring, the secondary "slice" on one node is a copy of the primary slice of another node, but the other node's secondary slice is a copy of the primary slice of a third node.

The $N+1^{th}$ node becomes active upon failure of an operational node and takes the place of the failed node within a pairing. When the $N+1^{th}$ node needs to read a block from disk, a resynch bit map is checked in its main memory (typically volatile storage such as random-access memory (RAM) or Flash memory) to determine if that block has already been copied from the from the secondary slice of the failed node's data onto the primary slice of the $N+1^{th}$ node, which resides on the surviving node of the reciprocal pair. Data stored in the block may be needed when a query requesting the retrieval, updating or deletion of the data within that block is processed by the MPP database system, for example. If the block does exist on the $N+1^{th}$ node, the block is read from its local disk. If the block does not exist, the $N+1^{th}$ node sends a request across a communication link to the surviving node of the reciprocal pair to get the block. When this remote read request is fulfilled, the block is written to the local disk of the $N+1^{th}$ node and the associated bit map is updated so that future reads of data within that block can be satisfied locally (i.e., from the $N+1^{th}$ node).

In some embodiments, writes to the disk blocks (e.g., "update" SQL commands that are altering data stored on the nodes) are processed by both the $N+1^{th}$ node and the survivor in the reciprocal pair in order to maintain synchronization across the two nodes. In some implementations, an additional background process may bring data onto the $N+1^{th}$ node. The background process executes on the $N+1^{th}$ node, scanning some or all of the storage blocks on the node and checking the bit map for each block. In cases where unread data does not exist on the $N+1^{th}$ node, the data is retrieved from the surviving node of the reciprocal pair. Using this background process, data from the surviving node can be brought onto the $N+1^{th}$ node even if the specific data has not yet been requested from an application.

After all the data blocks have been brought over to the $N+1^{th}$ node, it may then switch from "on-demand-resynch mode" to "normal mode" (i.e., merely servicing data requests without having to check the bit map) by setting control information as to which node has the main copy and which has the secondary copy. The bit map may then be discarded.

In one particular implementation, a client making a request to the collection of blades first makes a broadcast request looking for a root information server, which provides IP addresses for all blades in the MPP system to the client. The client then sends its requests to each IP address. To process transaction requests from an application once the failover has occurred, the root information service is updated, indicating that the failed node's "slice" of the data is now served by the $N+1^{th}$ node. In other instances, the IP address may be transferred from the failed node to the $N+1^{th}$ node.

Figure 3:
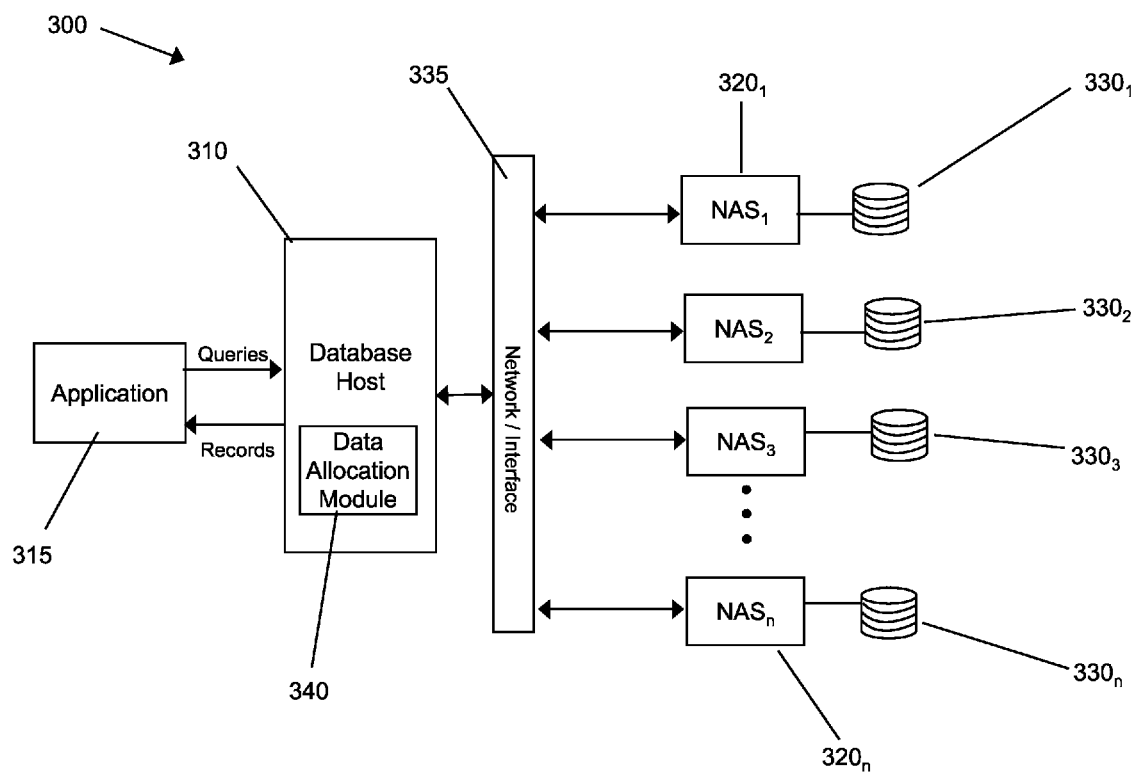
FIG. 3 is a block diagram of relational databases and network attached database storage appliances as configured in accordance with one embodiment of the present invention.

The methods and techniques describe above may be implemented in hardware and/or software and realized as a system for allocating and distributing data among storage devices. For example, the system may be implemented as a data-allocation module within a larger data storage appliance (or series of appliances). Thus, a representative hardware environment in which the present invention may be deployed is illustrated in FIG. 3.

The illustrated system 300 includes a database host 310, which responds to database queries from one or more applications 315 and returns records in response thereto. The application 315 may, for example, run on a client machine that communicates with host 310 via a computer network, such as the Internet. Alternatively, the application may reside as a running process within host 310.

Host 310 writes database records to and retrieves them from a series of storage devices, illustrated as a series of NAS appliances 320. It should be understood, however, that the term "storage device" encompasses NAS appliances, storage-area network systems utilizing RAID or other multiple-disk systems, simple configurations of multiple physically attachable and removable hard disks or optical drives, etc. As indicated at 325, host 310 communicates with NAS appliances 320 via a computer network or, if the NAS appliances 320 are physically co-located with host 310, via an interface or backplane. Network-based communication may take place using standard file-based protocols such as NFS or SMB/CIFS. Typical examples of suitable networks include a wireless or wired Ethernet-based intranet, a local or wide-area network (LAN or WAN), and/or the Internet.

NAS appliances $320_1, 320_2 \ldots 320_n$ each contain a plurality of hard disk drives $330_1, 330_2 \ldots 330_n$. The number of disk drives 330 in a NAS appliance 120 may be changed physically, by insertion or removal, or simply by powering up and powering down the drives as capacity requirements change. Similarly, the NAS appliances themselves may be brought online or offline (e.g., powered up or powered down) via commands issued by controller circuitry and software in host 310, and may be configured as "blades" that can be joined physically to the network as capacity needs increase. The NAS appliances 320 collectively behave as a single, variable-size storage medium for the entire system 300, meaning that when data is written to the system 300, it is written to a single disk 330 of a single NAS appliance 320.

Host 310 includes a network interface that facilitates interaction with client machines and, in some implementations, with NAS appliances 320. The host 310 typically also includes input/output devices (e.g., a keyboard, a mouse or other position-sensing device, etc.), by means of which a user can interact with the system, and a screen display. The host 310 further includes standard components such as a bidirectional system bus over which the internal components communicate, one or more non-volatile mass storage devices (such hard disks and/or optical storage units), and a main (typically volatile) system memory. The operation of host 300 is directed by its central-processing unit ("CPU"), and the main memory contains instructions that control the operation of the CPU and its interaction with the other hardware components. An operating system directs the execution of low-level, basic system functions such as internal memory allocation, file management and operation of the mass storage devices, while at a higher level, a data allocation module 335 performs the allocation functions described above in connection with data stored on NAS appliances 320, and a storage controller operates NAS appliances 320. Host 310 maintains an allocation table so that, when presented with a data query, it "knows" which NAS appliance 320 to address for the requested data.

Data allocation module 335 may in some cases also include functionality that allows a user to view and/or manipulate the data allocation process. In some embodiments the module may set aside portions of a computer's random access memory to provide control logic that affects the data allocation process described above. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC.

Additionally, the software could be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM. The nodes may be implemented as stand-alone appliances, partitions (either physical or virtual) of single appliances, or combinations of the two. In particular embodiments, the nodes are independent appliances, each including a dedicated copy of an operating system such as Linux.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. An array of network-attached storage appliances for storing data thereon, the array comprising:
   a plurality of reciprocal appliance pairings, each appliance pairing comprising a pair of nodes connected to the network, each of the nodes of an appliance pairing storing data organized into data blocks and associated with both nodes of the pairing; and
   a failover storage appliance, connected to the network, for receiving data from a surviving appliance of a pairing upon detecting a failure of a failed appliance of the pairing and checking a bitmap value associated with the data blocks to determine if data needed to process the data query exists on the failover network-attached storage appliance.

2. The array of claim 1 wherein each node comprises at least two data partitions, a first data partition storing data associated with the respective node and a second data partition storing data associated with a reciprocal node.

3. The array of claim 1 wherein each node further comprises at least two file system directories, a first file system directory cataloging data associated with the respective node and a second file system directory cataloging data associated with a reciprocal node.

4. The array of claim 1 wherein the failover network-attached storage appliance is further configured to receive and process a data query originally intended to be processed by the failed appliance.

5. The array of claim 1 wherein the data is received at the failover network-attached storage appliance in response to execution of a stored procedure requesting the data.

6. The array of claim 1 wherein the data is received at the failover network-attached storage appliance in response to receiving a data query requiring the data.

7. A method of storing and retrieving data, the method comprising the steps of:
   providing a plurality of reciprocal appliance pairings, each appliance pairing comprising a pair of nodes;
   storing, at each of the nodes of an appliance pairing, data organized into data blocks and associated with both nodes of the pairing;
   detecting a failure at one appliance of a pairing and, in response thereto, receiving, at a failover storage appliance, data from a surviving appliance of the pairing; and
   checking a bitmap value associated with the data blocks to determine if data needed to process the data query exists on the failover network-attached storage appliance.

8. The method of claim 7 further comprising receiving and processing, at the failover storage appliance, a data query originally intended to be processed by the failed appliance.

9. The method of claim 8 wherein the data is received at the failover network-attached storage appliance in response to receiving the data query requiring the data.

10. The method of claim 7 further comprising receiving the data at the failover storage appliance in response to execution of a stored procedure requesting the data.

* * * * *